United States Patent
Diao et al.

(10) Patent No.: US 11,229,311 B2
(45) Date of Patent: Jan. 25, 2022

(54) FOOD PREPARATION SYSTEM

(71) Applicant: MIDEA GROUP CO., LTD., Foshan (CN)

(72) Inventors: Liang Diao, San Jose, CA (US); Haisong Gu, Cupertino, CA (US)

(73) Assignee: MIDEA GROUP CO., LTD., Foshan (CN)

(*) Notice: Subject to any disclaimer, the term of this patent is extended or adjusted under 35 U.S.C. 154(b) by 347 days.

(21) Appl. No.: 16/230,815

(22) Filed: Dec. 21, 2018

(65) Prior Publication Data
US 2019/0200797 A1     Jul. 4, 2019

Related U.S. Application Data

(60) Provisional application No. 62/612,426, filed on Dec. 30, 2017.

(51) Int. Cl.
*A47J 27/00*      (2006.01)
*A47J 36/32*      (2006.01)
(Continued)

(52) U.S. Cl.
CPC .............. *A47J 27/00* (2013.01); *A47J 29/00* (2013.01); *A47J 36/321* (2018.08); *G05B 19/42* (2013.01); *A47J 33/00* (2013.01); *B25J 9/00* (2013.01)

(58) Field of Classification Search
CPC ...... A47J 37/0664; A47J 27/00; A47J 36/321; A47J 29/00; A47J 33/00
(Continued)

(56) References Cited

U.S. PATENT DOCUMENTS

2015/0136760 A1*   5/2015   Lima .................... H05B 6/705
                                                           219/709
2016/0260014 A1   9/2016   Hagawa et al.
(Continued)

FOREIGN PATENT DOCUMENTS

CN         103955718 A     7/2014
CN         104042124 A     9/2014
(Continued)

OTHER PUBLICATIONS

American Group Co., Ltd., The First Office Action, Application No. CN 201880078858.6, dated Jan. 28, 2021, 32 pgs.
(Continued)

*Primary Examiner* — Phuong T Nguyen
(74) *Attorney, Agent, or Firm* — Morgan, Lewis & Bockius LLP (57) ABSTRACT

A food preparation system and method include: triggering image capturing of a camera to obtain one or more images of a food support platform while the food support platform supports a first food item; performing ingredient recognition for the first food item, including: classifying a feature tensor of a respective image in a general classifier to identify one or more first-level food ingredient categories corresponding to the first food item; and classifying the feature tensor of the respective image in a respective detailed classifier corresponding to each of the one or more first-level food ingredient categories to identify a corresponding second-level food ingredient category corresponding to the first food item, wherein the second-level food ingredient category is a sub-category of said each first-level food ingredient category; and, adjusting one or more heating units for heating the first food item in accordance with the ingredient recognition that has been performed.

7 Claims, 7 Drawing Sheets

(51) Int. Cl.
*A47J 29/00* (2006.01)
*G05B 19/42* (2006.01)
*A47J 33/00* (2006.01)
*B25J 9/00* (2006.01)

(58) Field of Classification Search
USPC .......... 99/287, 295, 332, 341, 451; 219/678, 219/702, 705, 707, 709, 711, 714, 720, 219/728, 747, 393
See application file for complete search history.

(56) References Cited

U.S. PATENT DOCUMENTS

| | | |
|---|---|---|
| 2017/0069225 A1 | 3/2017 | Ortiz et al. |
| 2017/0176019 A1 | 6/2017 | Bhogal et al. |

FOREIGN PATENT DOCUMENTS

| | | |
|---|---|---|
| CN | 104246375 A | 12/2014 |
| CN | 105142408 A | 12/2015 |
| CN | 105740402 A | 7/2016 |
| CN | 105902181 A | 8/2016 |
| CN | 105938558 A | 9/2016 |
| CN | 106419498 A | 2/2017 |
| CN | 106461461 A | 2/2017 |
| CN | 106529564 A | 3/2017 |
| CN | 206565858 U | 10/2017 |
| CN | 107341340 A | 11/2017 |
| CN | 107393000 A | 11/2017 |
| CN | 107440475 A | 12/2017 |
| CN | 107440476 A | 12/2017 |
| DE | 102014110559 A1 | 1/2016 |
| EP | 2977683 A1 | 1/2016 |
| JP | 2004207843 A | 7/2004 |
| JP | 2010096626 A | 4/2010 |
| JP | 2011033312 A | 2/2011 |
| JP | 2015026122 A | 2/2015 |
| JP | 2015068542 A | 4/2015 |
| JP | 2015158351 A | 9/2015 |
| JP | 2016502061 A | 1/2016 |
| WO | WO2014/086487 A1 | 6/2014 |
| WO | WO 2017033406 A1 | 3/2017 |

OTHER PUBLICATIONS

Midea Group Co Ltd, Extended European Search Report, EP18895500.9, dated Sep. 21, 2020, 8 pgs.
Midea Group Co Ltd, International Search Report and Written Opinion, PCT/CN2018/116511, dated Feb. 18, 2019, 9 pgs.
Midea Group Co., Ltd., International Preliminary Report on Patentability, PCT/CN2018/116511, dated Jun. 30, 2020, 5 pgs.
Notification of Reasons for Refusal, Japanese Patent Application No. 2020-535973, dated May 12, 2021, 11 pgs.
Notification of Reason for Refusal, Korean Application No. 10-2020-7018935, dated Apr. 14, 2021, 8 pgs.
American Group Co., Ltd., Second Office Action, CN Application No. 201880078858.6, dated Jun. 16, 2021, 25 pgs.

* cited by examiner

Figure 6

FOOD PREPARATION SYSTEM

CROSS REFERENCE TO RELATED APPLICATION

This application claims priority under Section 119(e) and the benefit of U.S. Provisional Application No. 62/612,426, filed Dec. 30, 2017, the entire disclosure of which is incorporated herein in its entirety.

FIELD OF THE TECHNOLOGY

The present disclosure relates to the field of home appliances, and in particular, to a food preparation method and system based on ingredient recognition.

BACKGROUND OF THE TECHNOLOGY

Conventional electric food preparation systems, such as microwave ovens, stove tops, toaster ovens, electric cookers, ovens, and steamers, etc. rely on manual inputs for cooking temperatures and cooking duration specification. These conventional systems require the user to possess a substantial amount of knowledge and experience regarding how different food ingredients of a dish should be heated and cooked to the right level of doneness without compromising food safety requirements. Some newer models of electric food preparation systems allow a user to select from a few preset food options, and adjust cooking time and power level according to the user's selections. However, such preset selection menu is either too limited for the wide variety of food that a user might wish to cook, or too extensive making it difficult to navigate.

As people are more interested in improving health and style of living, the quality and nutritional values of the food that people consume become more and more important to them. Some applications on smart devices provide databases of food ingredients and their corresponding nutritional information. However, such applications typically require the user to enter the names of the food ingredient and the quantity for each ingredient in order to provide the corresponding nutritional values. The process is cumbersome and inefficient, severely limiting the utility of such applications.

Some researchers have suggested using artificial intelligence and deep learning techniques to automatically recognize food ingredients based on images of a dish. However, due to the great variations in form that food ingredients can take on in dishes, and the varied conditions under which the images are captured, recognition results are very poor. In addition, the number of food ingredients are in the hundreds and thousands, and a dish may have dozens of ingredients, making the automatic recognitions models very large and computationally intensive, and difficult to deploy outside of pure academic research settings. Furthermore, these systems are difficult to scale up, because the number of parameters have to be changed and the training of the model has to be repeated each time a new ingredient needs to be added to the model.

For these reasons, better food preparation systems that are capable of providing consistent food ingredient recognition with modest resource consumption, that is extensible, and that can adjust food preparation controls and/or provide nutritional recommendations are desirable.

SUMMARY

As discussed in the background, conventional food preparation system provides limited capabilities in terms of controlling food preparation automatically based on automatic ingredient recognition. Conventional food ingredient recognition is inaccurate, requires a large amount of computing resources, and is not easily extensible. The method and system disclosed herein address these drawbacks of the conventional method and systems in a number of ways.

For example, the images that are used in ingredient recognition are taken in situ as the food is being placed in the food preparation system. The baseline image of the food preparation system helps to eliminate the background effectively, leaving the pertinent image information for the food only. In addition, the size and proportions of the food ingredients in the images are also known given the known dimensions of the food preparation system in which the food has been placed. In situ image acquisition eliminates the problem of conventional systems where the image acquisition is performed under a wide variety of conditions, making the image processing difficult, and more prone to false recognition results. Other in situ image acquisition techniques are also used to further improve image consistency and fidelity of the images.

In addition, the image processing for ingredient recognition is performed in two stages, a general classification stage and a detailed classification stage. The general classification stage classify the food ingredients of a dish into coarse categories, such as meat, vegetables, grains, etc.; while the detailed classification stage classify the food ingredients of a recognized category into more specific ingredient labels, such as fish, chicken, beef, etc. under the meat category. The coarse category of the food ingredients are determined based on the specific usage settings of the food preparation systems. For example, a microwave oven when used in the cooking mode, uses raw food ingredient categories, such as meat, vegetables, grains, etc., while when used in the reheating mode, uses cooking style categories, such as stir fry, baked dish, roast, pizza, soup, etc. By choosing the coarse categories first, the computation models are reduced in size and the computation is reduced in amount, and the recognition accuracy is improved, due to the more focused classification process. In addition, the recognition system is more scalable because when an ingredient is added, only the detailed classification model for the impacted coarse category needs to be updated. In some embodiments, only the top n (e.g., 3) food ingredients are recognized through image processing, further reducing the computation complexity, processing time and memory usage.

As disclosed herein, a food preparation system comprises: a food support platform configured to support food; a camera with a field of view directed to the food support platform; one or more heating units that are configured to heat food placed on the food support platform; and a food preparation control unit for controlling the camera and the one or more heating units, the food preparation control unit including one or more processors and memory storing instructions, the instructions, when executed by the one or more processors cause the processors to perform operations comprising: triggering image capturing of the camera to obtain one or more images of the food support platform while the food support platform supports a first food item; performing ingredient recognition for the first food item based on the one or more images of the food support platform, including: classifying a feature tensor of a respective image of the one or more images in a general classifier to identify one or more first-level food ingredient categories corresponding to the first food item; and classifying the feature tensor of the respective image in a respective detailed classifier corresponding to each of the one or more first-level food ingredient categories to identify a corresponding second-level food ingredient category corresponding to the first food item, wherein the second-level food ingredient category is a sub-category of said each first-level food ingredient category; and, adjusting the one or more heating units for heating the first food item in accordance with the ingredient recognition that has been performed.

As disclosed herein, in some embodiments, A method of controlling food preparation comprises: at a food preparation system comprising: a food support platform configured to support food; a camera with a field of view directed to the food support platform; one or more heating units that are configured to heat food placed on the food support platform; and a food preparation control unit for controlling the camera and the one or more heating units, the food preparation control unit including one or more processors and memory: triggering image capturing of the camera to obtain one or more images of the food support platform while the food support platform supports a first food item; performing ingredient recognition for the first food item based on the one or more images of the food support platform, including: classifying a feature tensor of a respective image of the one or more images in a general classifier to identify one or more first-level food ingredient categories corresponding to the first food item; and classifying the feature tensor of the respective image in a respective detailed classifier corresponding to each of the one or more first-level food ingredient categories to identify a corresponding second-level food ingredient category corresponding to the first food item, wherein the second-level food ingredient category is a sub-category of said each first-level food ingredient category; and, adjusting the one or more heating units for heating the first food item in accordance with the ingredient recognition that has been performed.

In some embodiments, a system includes processors and memory that performs any of the methods described herein. In accordance with some embodiments, an electronic device includes one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by an electronic device, cause the device to perform or cause performance of the operations of any of the methods described herein. In accordance with some embodiments, an electronic device includes: means for capturing images, means for heating food items, and means for performing or causing performance of the operations of any of the methods described herein.

Various advantages of the present application are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
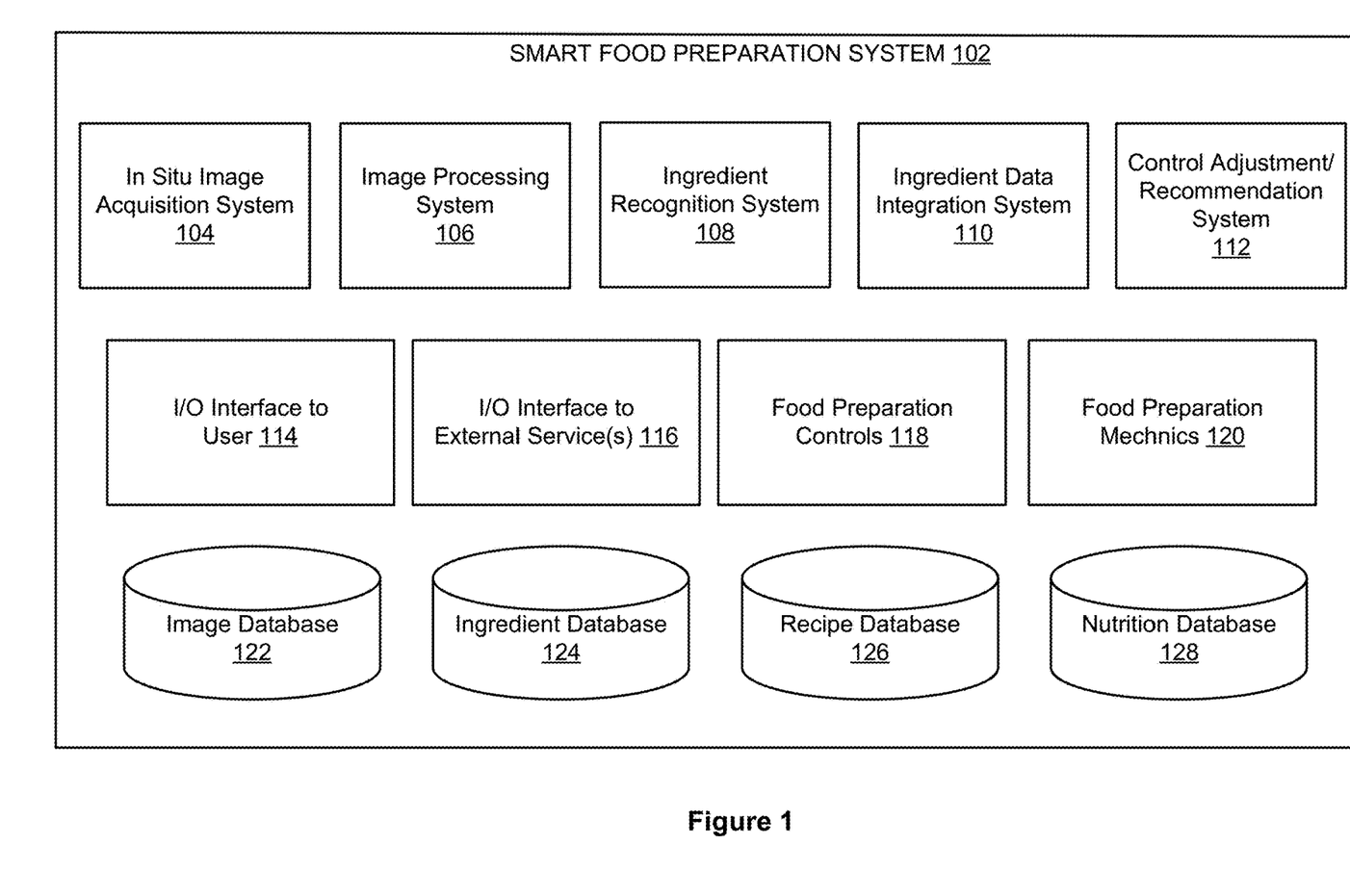
FIG. 1 is a block diagram of a food preparation system in accordance with some embodiments.

FIG. 1 is a block diagram of a food preparation system 102 in accordance with some embodiments. The food preparation system includes systems for heating food items including cooking raw food items or reheating previously cooked food items. Examples of the food preparation system include microwave ovens, stoves, toaster ovens, convection ovens, electric cookers, grill pans, etc. The food preparation system 102 includes heating systems that is capable of heating food items through various means, such as conduction means, convection means, radiation means, conduction means, etc. The amount of heat or power dissipated to the food items, the rate by which the heat is dissipated to the food items, the distribution of the heat that is dissipated to the food items, and/or the duration of the heat dissipation are controllable by various control means (e.g., knobs, buttons, or apps) that are installed on the food preparation system and coupled to the heating means. In some embodiments, the controls are manually adjustable by a user.

As shown in FIG. 1, in some embodiments, the food preparation system includes an in situ image acquisition system 104. The in situ image acquisition system includes one or more still image camera or video cameras that are installed at a location within or in proximity to the food preparation system, such that the field of view of the cameras encompass the interior of the compartment in which food items will be inserted and cooked. For example, the camera is optionally installed in the interior top wall of a smart oven, with a field of view of the top of the oven rack. Another camera is optionally installed on the top side edge of the interior of the oven, with a field of view of the oven rack from the side over the oven rack. In some embodiments, the camera is installed on the exterior of the compartment in which the food is cooked, and points at the location of the food item through a transparent window (e.g., a thermal insulating window). In some embodiments, the camera is placed outside of the compartment or over platform on which the food items will be placed. The in situ image acquisition system includes a data storage system that stores the dimensions of the food cooking compartment, and the dimensions of the reference markers within the food cooking compartment, the distances between the camera and the various reference markers within the food cooking compartment, such that images taken by the cameras can be used to accurately determine the size and shape of the food items within the images. This in situ image acquisition system 104 thus eliminates the problems with conventional image acquisition systems which require the user's special attention to place a reference marker within the images or use images without the benefit of the size and location and orientation information of the items within the images.

In some embodiments, the in situ image acquisition system 104 includes an image capture triggering system. For example, in some embodiments, the image capturing is triggered when the image capture triggering system detects that there has been a change in the field of view of the camera. For example, when the oven door is opened, the lighting condition in the oven will be changed, and the image capturing will be triggered in response to the opening of the oven door. In some embodiments, the image capturing is triggered when the food item starts to appear in the field of view of the camera. In some embodiments, the image capturing is triggered when then food item is completely inserted and the oven door is closed. For example, the image capturing system starts operation in response to detecting the opening of the oven door, and actually triggers the capturing of an image in response to detecting closing of the oven door. In some embodiments, a series of images are captured, so that images of the food item at various predetermined locations along its path to its final placement locations are captured. With images of the food item in different size and perspectives, it helps to improve the image analysis accuracy. For example, a first image is captured when the oven door is open, and the food item is inserted partially, so the image only includes part of the food item. As the food item is inserted further into the oven, additional images are captured, including larger and larger portions of the food item, until a final image is taken when the food item is placed on the oven rack and the oven door is closed. In some embodiments, the image capture trigger system also instructs the camera to capture and store an image of the oven rack immediately before the oven door is opened, as the baseline image of the interior of the oven. In some embodiments, the image capturing is triggered manually in response to a user's input, for example, after the user has inserted the food item into the food cooking compartment. Manual trigger is easier and less complicated to implement, and allows the user to purposefully capture images that best reflect the characteristics of the food item for ingredient recognition.

In some embodiments, the food preparation system 102 includes an image processing system 106. The image processing system 106 obtains the images captured by the in situ image acquisition system, and preprocesses the images to remove the background from the images based on the baseline image captured before the insertion of the food item. The baseline image captures the exact condition of the food support platform in the food cooking compartment of the food preparation system, and provides an excellent filter for the images containing the food item to remove the background.

In some embodiments, the in situ image acquisition system optionally includes controls for multiple lights located in different locations around the food supporting platform (e.g., the bottom of the cooker, the top of the oven rack, the plate inside the microwave oven, etc.), and by turning on and off the different lights, and capturing images under different lighting conditions, the shape and texture of the food item is enhanced in the images. For example, the shape of a muffin is different from the shape of a pizza, and the texture of meat sauce is different from the texture of mashed potatoes. This additional information in the images will further help distinguishing the food items and their ingredients.

In some embodiments, the food preparation system includes an ingredient recognition system 108. The ingredient recognition system 108 processes the images of the food item after the background has been removed to generate a food item feature tensor. The feature tensor is optionally generated in accordance with the requirement of the ingredient recognition system. For a rule-based ingredient recognition system, the feature tensor includes values of various parameters of the rule-based ingredient recognition system. The parameters optionally includes color content, saturation, size of image features, shapes of image features, overall shape of food item, etc. In some embodiments, the ingredient recognition system uses machine-learning models that learn from a large number of labeled images or unlabeled images to recognize the ingredients of the food items captured in an input image. For such systems, the feature tensor is prepared based on the requirement of the machine-learning model. Feature extraction is performed by inputting the image into the machine learning model, and classification is performed by the machine learning model. In some embodiments, the machine learning model is a deep neural network model, that processes the images through a large number of hidden layers. In some embodiments, a combined hybrid system is used for ingredient recognition.

In some embodiments, the food preparation system 102 includes an ingredient data integration system 110. The ingredient data integration system 110 retrieves nutrition data for the recognized ingredients and produces a nutritional assessment for the food item that is captured in the images. In some embodiments, the ingredient data integration system 110 retrieves recipes for the ingredients that have been recognized, and optionally provide cooking instructions to the user or automatically adjusting cooking time and heating power based on the requirement of the recipe. In some embodiments, the ingredient data integration system 110 retrieves multiple recipes that include the recognized ingredients, and provides a recommendation to the user based on a comparison of the nutritional information of the different recipes.

In some embodiments, the ingredient recognition system 108 only recognizes the top n main ingredients in the food item captured in the images, and the ingredient data integration system 110 retrieves recipes containing the recognized main ingredients, and identifies additional ingredients in the recipes as the other ingredients in the food item. In some embodiments, the additional ingredients in the recipes are used to verify the results of the ingredient recognition system. For example, if the ingredient recognition systems produce four rough categories of ingredients as the likely ingredients of the food item, only the top three ingredient categories are further processed to identify the specific sub-categories of food ingredients within those top three ingredient categories that are contained in the food item. The fourth category is left unspecified to the level of specificity comparable to the other three categories. With the information from the recipes, if the additional ingredients in the recipe include ingredients from the fourth category, then the fourth category is further specified without utilizing the ingredient recognition models, saving data processing time and improving recognition accuracy. In some embodiments, the quantity information of the various ingredients is also determined based on the recipes. For example, the quantities of the main ingredients that are recognized from the images are used as the basis to determine the other ingredients that are not directly recognizable from the images (e.g., oils, creams, spices, powders, ingredients in grounded form or unrecognizable forms, etc.), and to provide overall nutritional information based on both the ingredients recognized through image analysis and the additional ingredients identified based on the retrieved recipes.

In some embodiments, the food preparation system 102 includes control adjustment/recommendation system 112. The control adjustment/recommendation system 112 retrieves cooking instructions for the ingredients that have been identified and/or the recipes that have been retrieved to determine the best temperature and heating power to cook or reheat the food item. In some embodiments, the food preparation system 102 automatically adjusts the heating parameters of the food preparation system 102. In some embodiments, the food preparation system 102 provides the cooking control adjustment recommendations to the user and has the user manually adjust the cooking parameters using the physical knobs and buttons on the food preparation system 102. In some embodiments, the control adjustment/recommendation system 112 optionally provides recommendations regarding how to cook the food item in accordance with one recipe versus another recipe based on the nutritional and taste preference of the user.

In some embodiments, the food preparation system continues to capture images of the food item during cooking or reheating of the food item, grades the food ingredient for doneness and appearance, and automatically adjusts the cooking temperature and cooking time based on the current appearance of the food item. In some embodiments, the control adjustment/recommendation system 112 generates an alert when the image of the food item indicates that the food item has been cooked to the right amount of doneness, and should be removed from the cooking compartment.

In some embodiments, the food preparation system 102 includes I/O interface to users 114, which optionally includes a display, a speaker, a keyboard, a touch-screen, a voice input output interface etc. The I/O interface to users 114 is used to provide recommendations, alerts, and nutritional information to the user and receive control instructions from the user.

In some embodiments, the food preparation system 102 includes I/O interface 118 to external services. The external services include database services for recipes, ingredient recognition models, training corpus for ingredient recognition on a server, etc.

In some embodiments, the food preparation system 102 includes food preparation controls that adjust the power output of the heating units, cooking method, cooking temperature, heat distribution, cooking time, etc. The cooking preparation controls 118 includes buttons, knobs, touch-screen controls, etc. that respond both the manual adjustments and to the controls of the control adjustment/recommendation system 112.

In some embodiments, the food preparation system 120 includes food preparation mechanics, such as a cooking containing with heat coils at the bottom, an induction-cooking surface, a cooking enclosure with a food support surface such as an oven rack. In some embodiments, turning and churning mechanisms are also included in the food preparation mechanics 120, such as stirrers, rotisseries, fans, etc. to turn or rotate food items, and redistribute the heat or the heating units around the food items.

In some embodiments, the food preparation system 102 also includes image databases 122 of previously captured images of food items, or images from other similar food preparation systems. In some embodiments, the food preparation system 102 includes ingredient databases that include the categories, sub-categories, characteristics, nutritional data, cooking methods, images of various food ingredients and completed dishes. In some embodiments, the food preparation system 102 also includes a recipe database that is searchable by ingredients, and includes quantity information for different ingredients in the different recipes. In some embodiments, the food preparation system 102 also includes a nutrition database that includes nutritional information for different recipes and ingredients and how they are relevant to the user (e.g., allergy, medicinal uses, etc.). The other components of the food preparation system 102 retrieves information from the databases and also update the databases within additional information based on actual use of the food preparation system 102 and user feedback.

The above examples are provided merely for illustrative purposes. More details of the functions of the various components are set forth below with respect to other figures and illustrations. It can be understood that one or more components described herein may be used independently of other components. For example, the ingredient recognition system and ingredient data integration system may be implemented separately from the in situ image acquisition system and image processing system in some embodiments, and may be utilized to recognize ingredient based on previously captured images from another food preparation system.

Figure 2:
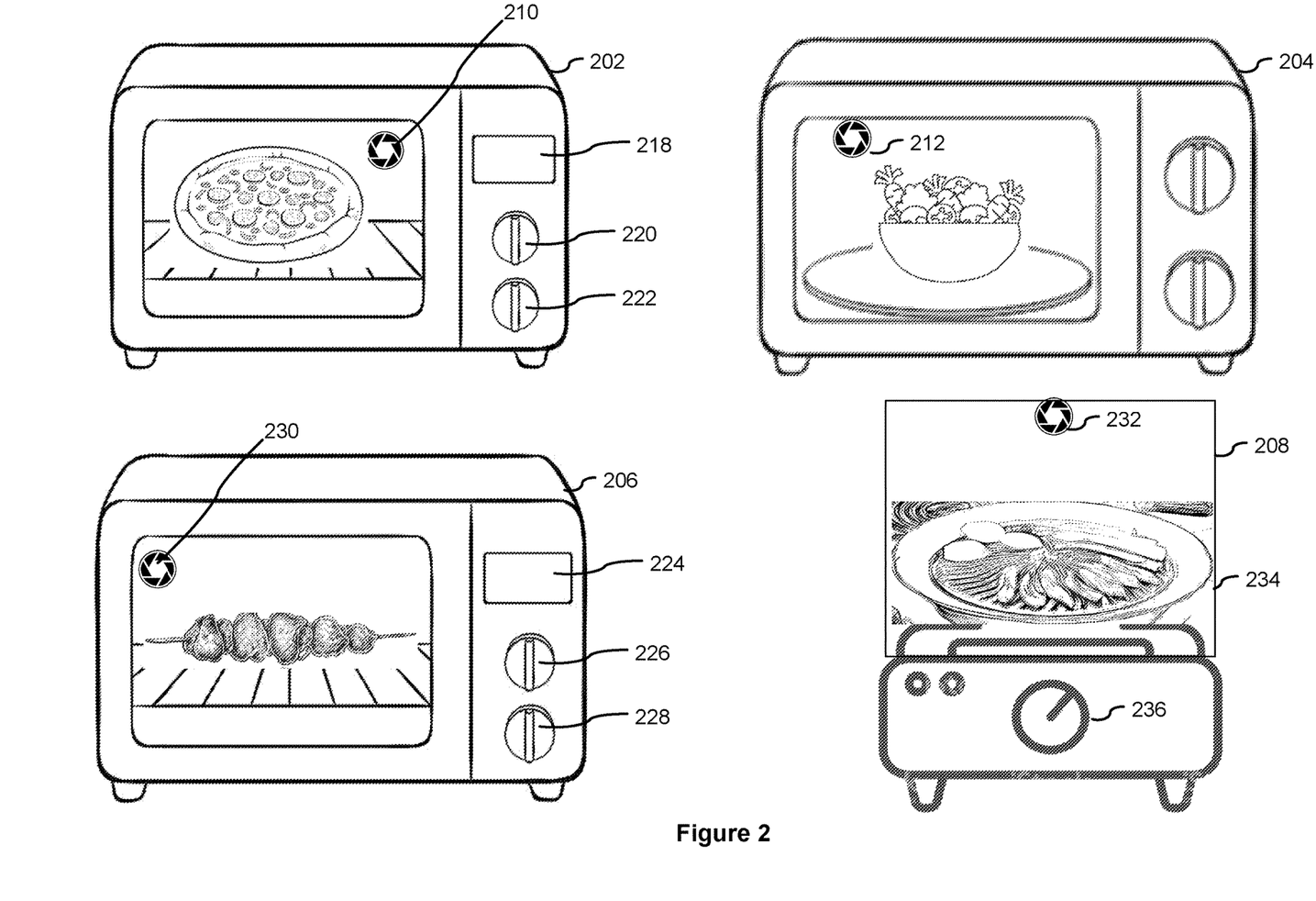
FIG. 2 illustrate a number of exemplary food preparation systems in accordance with some embodiments.

FIG. 2 illustrate a number of exemplary food preparation systems in accordance with some embodiments.

As shown in FIG. 2, a toaster oven 202, a microwave oven 204, a rotisserie oven 206, and an electric cooktop 208 each includes a respective camera (e.g., cameras 210, 212, 230, and 232) that is directed to a food support surface of the food preparation system in question (e.g., oven rack in the toaster oven 202, microwave rotation plate in the microwave oven 204, a rotational rod in the rotisserie oven 206, a cooking surface in the electric cooktop 208). The camera location is selected to be either inside of the cooking compartment of the food preparation system (e.g., the toaster oven 202, microwave oven 204, rotisserie oven 206), or directly above the food support surface (e.g., as in cooktop 234 of the electric cooktop 208). A display (e.g., display 218 and 224) may be included as an output interface to provide information and recommendations to the user regarding the food item that is being cooked or heated inside of the food preparation system. Controls 220, 222, 226, 228, and 236 are used to adjust the cooking parameters of the food preparation system.

Figure 3:
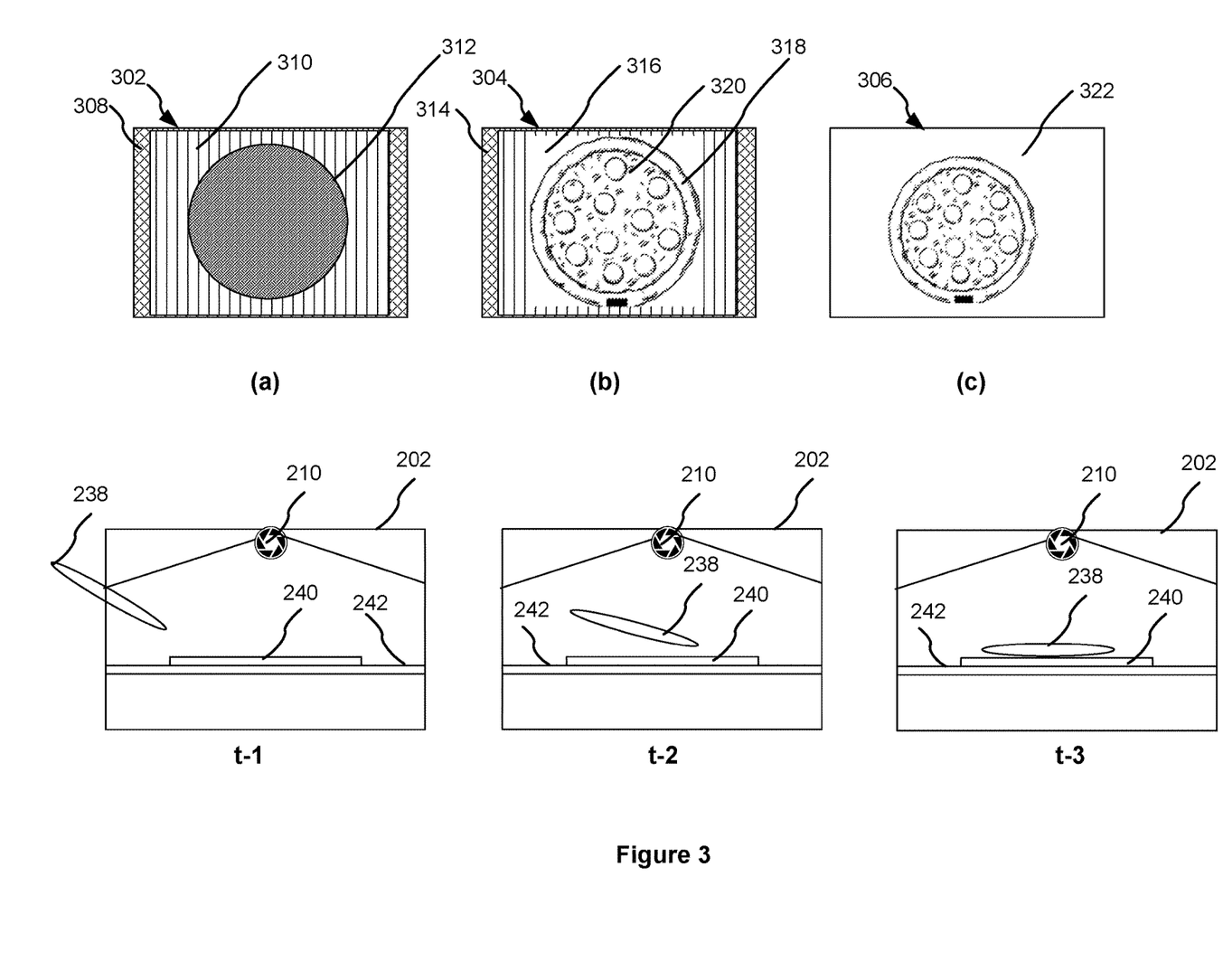
FIG. 3 illustrate image acquisition and image pre-processing of the food preparation system in accordance with some embodiments.

FIG. 3 illustrate image acquisition and image pre-processing of the food preparation system in accordance with some embodiments. As shown in FIG. 3(a), the baseline image 302 of the food support surface in an oven is captured immediately prior to the opening of the oven door or immediately in response to the opening of the oven door before insertion of the food item into the oven. The image includes portions 308 showing the walls of the oven, and portions 310 showing the oven rack. The image also includes a portion 312 showing a pizza stone. After the food item (e.g., a pizza) is inserted and placed flat on the pizza stone, the image 304 captured of the food support surface includes all the components in the image 302, and the image portion 320 showing the pizza. When the baseline image 302 is used as a filter to filter out the background of image 304, a pristine image 306 of the food item (e.g., the pizza) is obtained, with clean white background and a portion 322 showing the food item. Ingredient recognition based on these clean images, such as the one shown in FIG. 3(c) has much higher recognition fidelity than images captured under random conditions. Background removal without the proper baseline image captured under substantially the same conditions does not work well, and may create artifacts that skew the recognition results. With the in situ image capturing and background filtering, the image based ingredient recognition works much better.

FIG. 3 (t-1 through t-3) shows that a series of images are captured by camera 210 at different time points while the food item (e.g., pizza 238) is being inserted into the food preparation system (e.g., oven 202) and placed on a food support surface (e.g., pizza stone 240 on oven rack 242). The different images shows the food item from different distances and viewing angles, and provide additional information on the texture, shape, and color of the food item for ingredient recognition. In some embodiments, the images are filtered using the same baseline image, and partial images of the food item itself will be obtained. In some embodiments, the partial images are used in the ingredient recognition as well. In some embodiments, size, shape data are extracted from the partial images, and used in conjunction with the image information of the complete food item to determine the ingredients and quantity of the ingredients.

Figure 4A:
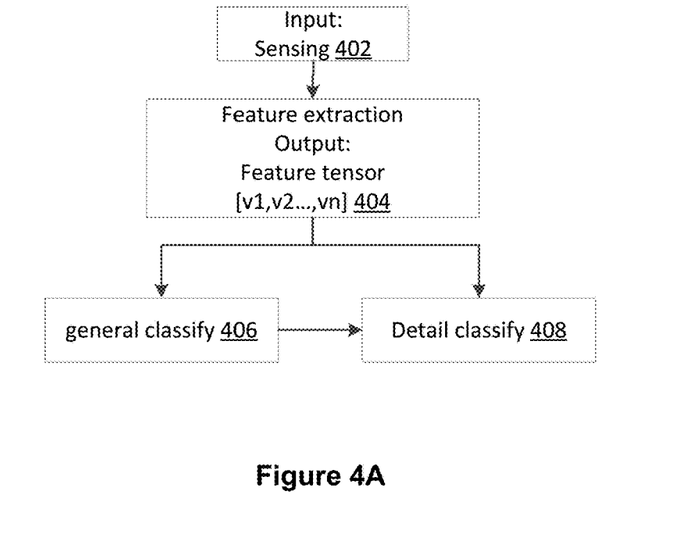
FIGS. 4A-4C are block diagrams of food ingredient recognition in accordance with some embodiments.
Figure 4B:
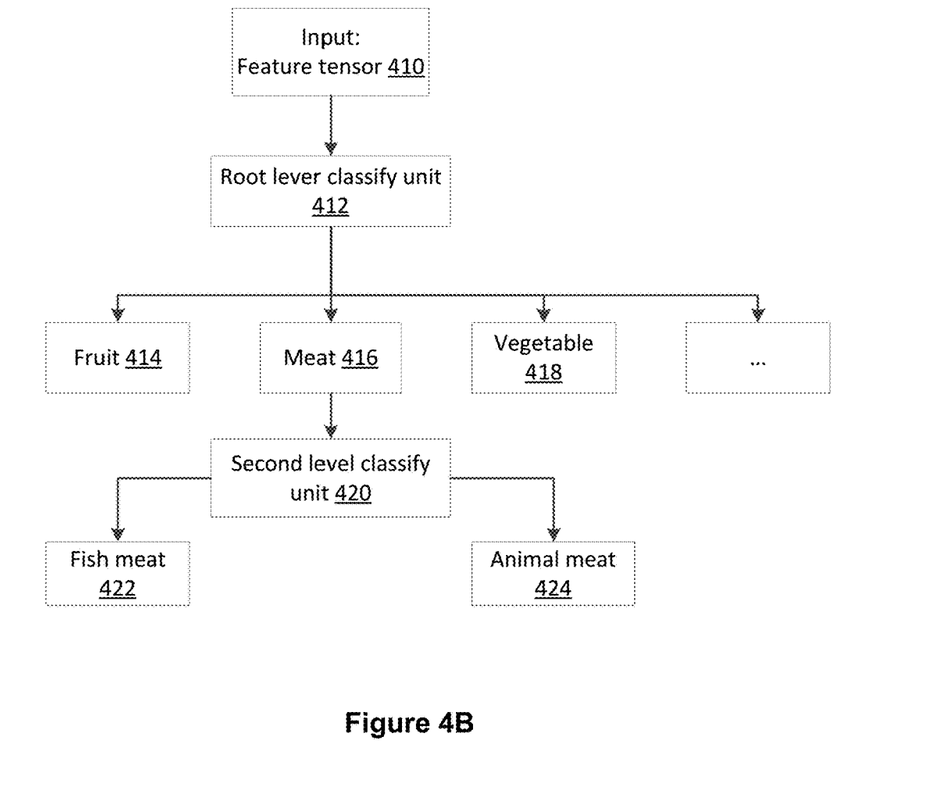
Figure 4C:
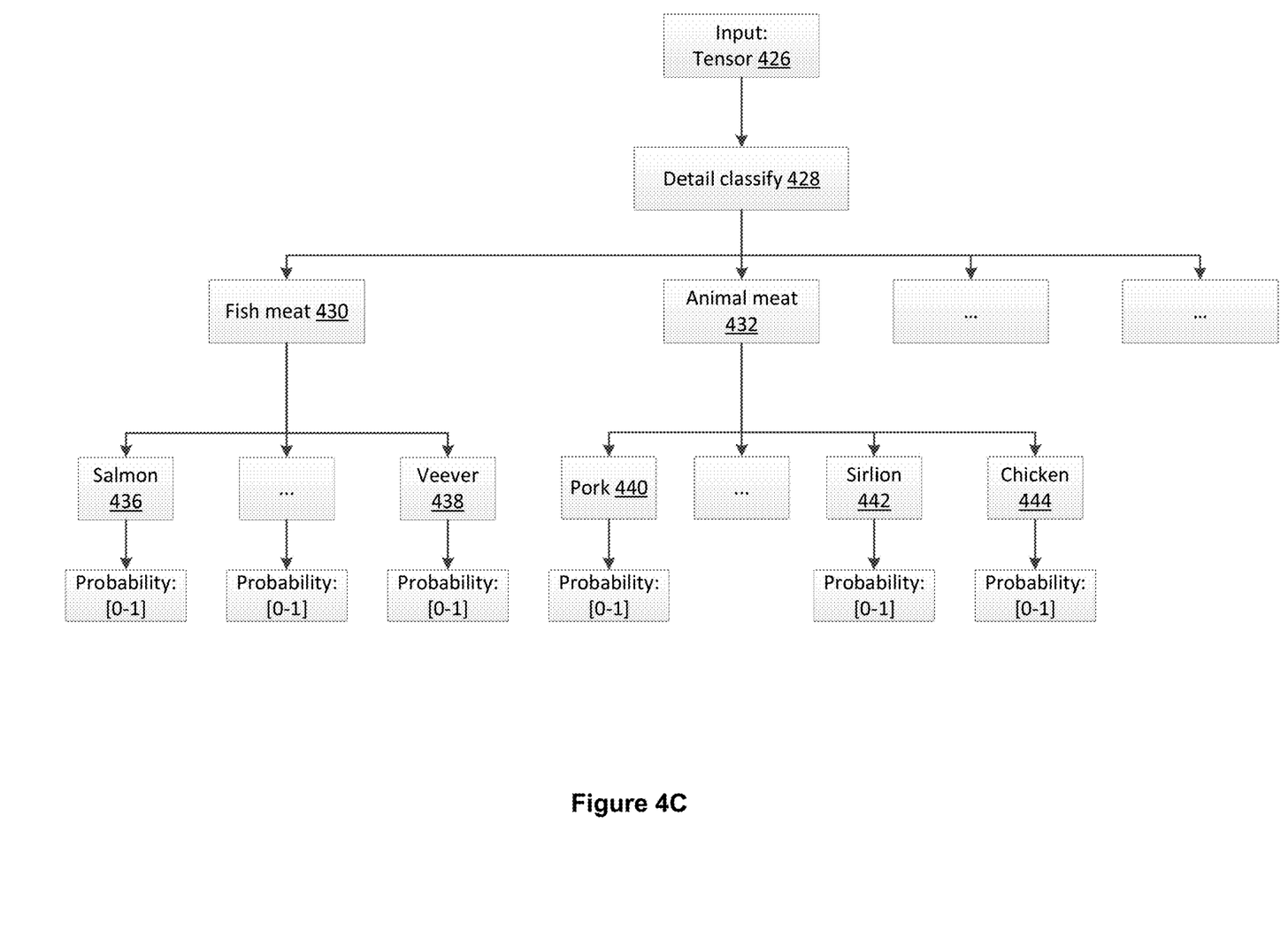

FIGS. 4A-4C are block diagrams of food ingredient recognition in accordance with some embodiments.

In FIG. 4A, the overall architecture of the ingredient recognition system 108 is illustrated. The input of the ingredient recognition system 108 is an image that is captured of the food support surface of the food preparation system while the food item is placed on the food support surface (and optionally of when the food item is being inserted into the food cooking compartment before reaching the food support surface). In some embodiments, the input image is the filtered image with the background removed. In some embodiments, the input also include additional information that are obtained through other sensors and input interfaces, such as spectral information, shape, size, weight information, etc. In some embodiments, the cooking method that is selected by the user is also used in the ingredient recognition as one of the input. In some embodiments, the operation mode of the food preparation system is used as an input for ingredient recognition. For example, different coarse category and recognition methods are used when the food preparation system is operating in the raw food cooking mode, versus a reheat mode. The input sensing stage 402 includes image capturing, image preprocessing, subsidiary information retrieval from external databases, or internal databases, input received from the I/O interface to users, etc.

In the feature extraction stage 404, a feature tensor (e.g., an ordered collection of feature vectors v1, v2, . . . vn) is produced. The feature tensor include feature vectors of different types of inputs, such as color histograms, shape feature, image segmentation data, weight data, image feature vectors, etc. The feature tensor is based on the classification methods that are used subsequently to classify the input data, and to generate the probability distribution for the different ingredients. Next, in a general classification stage 406, the feature tensor is used as input in a general classifier to determine the general ingredient categories for the ingredients in the food item. Once the general ingredient categories of the ingredients in the food item are determined, the detailed classification stage 408 is performed. In the detailed classification stage, the detailed classifiers corresponding to the top recognized coarse ingredient categories are used to further specify the detailed ingredient category or ingredient that make up the food item.

FIG. 4B illustrates that the classifier for different ingredients of food items is made up of multiple layers of classifiers, a root level classifier 412 that classify food ingredients into a number of first-level food categories, such as fruits, meat, vegetables, etc. In some embodiments, depending on the cooking method used (e.g., in a reheat mode of the food preparation system), a different set of first-level categories may be used, such as baked goods, soup, stir fry, salad, fried food, roasts, etc. may be used as the first-level food ingredient categories, as opposed to actual ingredient categories of the raw ingredients. Each first-level food ingredient category corresponds to a detailed first-level ingredient classifier. For example, among the first-level of classifiers, a fruit classifier 414 is able to further classify a fruit ingredient that has been identified in the food item using the feature tensor or a sub-portion of the input feature tensor. The meat classifier 416 is able to further classify a meat ingredient that has been identified in the food item using the feature tensor or a sub-portion of the input feature tensor. The vegetable classifier 418 is able to further classify a vegetable ingredient that has been identified in the food item using the feature tensor or a sub-portion of the feature tensor. In other words, the classifiers are organized into a tree-structure, with smaller classifiers focused on classification for just a category of ingredients rather than all categories of ingredients. This way, the computation is less complex, and the classifiers do not all have to be used in the classification of a food item, and only the most relevant and likely classifiers are triggered. Furthermore, the feature tensor can be reduced in dimension as well, since the features relevant to ingredients that do not exist in the food item do not need to be included in the feature tensor as input for the selected sub-level classifiers. As shown in FIG. 4B, once the food item has been classified as to include a meat item using the root level classifier 412, the feature tensor is input to the first-level classifier 420 corresponding to the meat category 416. Using the first-level classifier 420 corresponding to the meat category, the ingredient recognition system recognizes that the food item includes ingredients in two second-level food categories, namely the fish meat category 422 and the animal meat category 424.

FIG. 4C illustrates that each of the second-level food ingredient categories also have a respective second-level classifier that can take an input feature tensor or a portion of an input feature tensor and determine one or more third-level ingredient categories or ingredients that are present in the food item. As shown in FIG. 4C, when the input feature tensor or a portion of the input feature tensor is input 426 to the detailed classifiers, e.g., the fish meat classifier 430 and the animal meat classifier 432 in the detailed classification stage 428, the fish meat classifier 430 produces the probabilities of the food item including various types of fish meat, such as salmon 436, veever 438, etc.; and the animal meat classifier 432 produces the probabilities of the food item including various types of animal meat, such as pork 440, sirloin 442, chicken 444, etc. The ingredient recognition for the main ingredient categories is thus completed.

The food recognition method and system can be realized with rule-based approach or learning-based approach. In term of the learning-based approach, a label and storage method has been proposed herein. In addition to the label approach, a tree-structured recognition system is realized by a branchy architecture, as shown in FIGS. 4A-4C.

For the label method, in order to label the data, in some embodiments, ingredient categories list is generated and each category has a unique index number in the ingredient category list. Only the top n-primary ingredient categories are labeled into an input feature vector. The number n can be determined based on user input, so that there would be n parameters in one input vector. Each parameter will have an upper size limit which is determined by the ingredient categories list. For example, if there are 255 kinds of ingredient categories in the predefined ingredient category list, then each parameter has 8 bits. When only the top three main ingredients are labeled, then each label would have three parameters, so the whole size of the vector would be 24 bits. This would produce savings of computer resources to store this kind of labels than to label the food with vector whose length is same as the number of all the ingredient categories.

In some embodiments, for the recognition system, a model is established first, the model contains three parts showed in FIG. 4A. The first one is the feature extraction model 404 which can extract the basic vision feature from an image. The second one is the general classifier 406, which can classify the feature tensor into some general categories. The last one is the ingredient recognition branchy lines or detail classifiers, which will recognize the kinds of ingredients that are contained in the food. The recognition process of the detailed classifiers will be based on the result of general classifier.

In some embodiments, the input can be treated as a tensor with mixed information types which can be obtained with different kinds of sensors such as color cameras, depth sensors, mass spectrometers, and manual input, etc.

In some embodiments, the feature extraction component can be realized in rule-based approach or learning-based approach which means different features can be used. When the input is captured by an RGB camera, the extraction component would extract LBP, SIFT, color histograms, or even deep learning network feature maps as the output tensor which will be used as the input for later classifiers.

For the general classifier, it loads the tensor extracted by the feature extraction component and outputs the general recognition result. The general recognition means that it only classifies the input tensor into one or more general categories. For example, the apple ingredient will be categorized as fruit, the pork ingredient will be categorized as meat. Some dish with mixed ingredients will be categorized as a meat and vegetable dish. For some complicated situations, there would be more than one classifiers included in the general classifier to build a tree model, each classifier will have a different general lever above it. The purpose of the tree model is to recognize the image from some higher, general categories into some lower specific categories step by step as the feature tensor flows from the root to the branches of the tree model. For example, as shown in FIG. 4B, the image with a fried salmon would be first classified as meat. Then the image would be transported into the corresponding branch of the meat category and be classified as fish meat by the next stage classifier. This method will enhance the performance of the system both in accuracy and speed. The general category with different branchy chains, each chain is an independent classifier to other chains. The main purpose of the general classifier is to gain general information for the next stage recognition.

For the detailed classification stage, it will recognize the specific ingredients contained in the food item. It is also a multi-classifier structure. Each classifier is an independent unit and can only recognize one type ingredient. In other words, it can recognize whether the ingredient contained in the food item or not. When the ingredient is contained in the image, the unit will output a high score representing a high probability. The number of the units will be determined by the kinds of ingredients within a respective category.

All the classification units in the general and the detailed classifiers can be realized with different methods including traditional algorithm such as SVM, deep learning network, etc.

For the whole recognition system, when there is no general classifier to categorize the image into a particular general category, the feature tensor will be transported into every detailed classifier unit, which is time consuming. To enhance the speed of the whole system, the tree model is introduced, an arbitrary input will be recognize with the general classifier into a general class, then the feature tensor will be transported to some selected units based on the general class. For example, as the output of the second component shows the dish picture has a high probability only contain vegetables, then the feature tensor will be only transported to these detail classifier units whose purpose is to classify the exact vegetables contained in the dish, and the unit which is used to classify the type of meat will be skipped.

In a conventional "Deep-based Ingredient Recognition for Cooking Recipe Retrieval" method, a dish label method which gives each kind of food a one-zero vector, and the length of the vector is equal with the ingredient list number, which means that the number of the ingredients that can be recognized is same as the number of parameters in the vector. If the food item contains one ingredient, the parameter of the vector in corresponding position would be set into one, and the other parameters would be set into zero. But this kind of label method require more memory to store than the method proposed herein. There are more than thousands of kinds of ingredients in the whole world, and the conventional method would be intractable in the real world setting. In the method proposed herein, the memory storage that the label required depends on the categories of the top n main ingredients that are contained in the food, and is much more manageable.

Conventionally, a multitasking network would have separate models for recognizing food category and for recognizing ingredients. But in the method proposed herein, each type of ingredient has an independent branchy line to predict whether it is contained in the food item. Therefore, the currently disclosed system would be more flexible to add new kinds of ingredient into the system, without requiring the whole system to be rebuilt and the whole network retrained.

Figure 5:
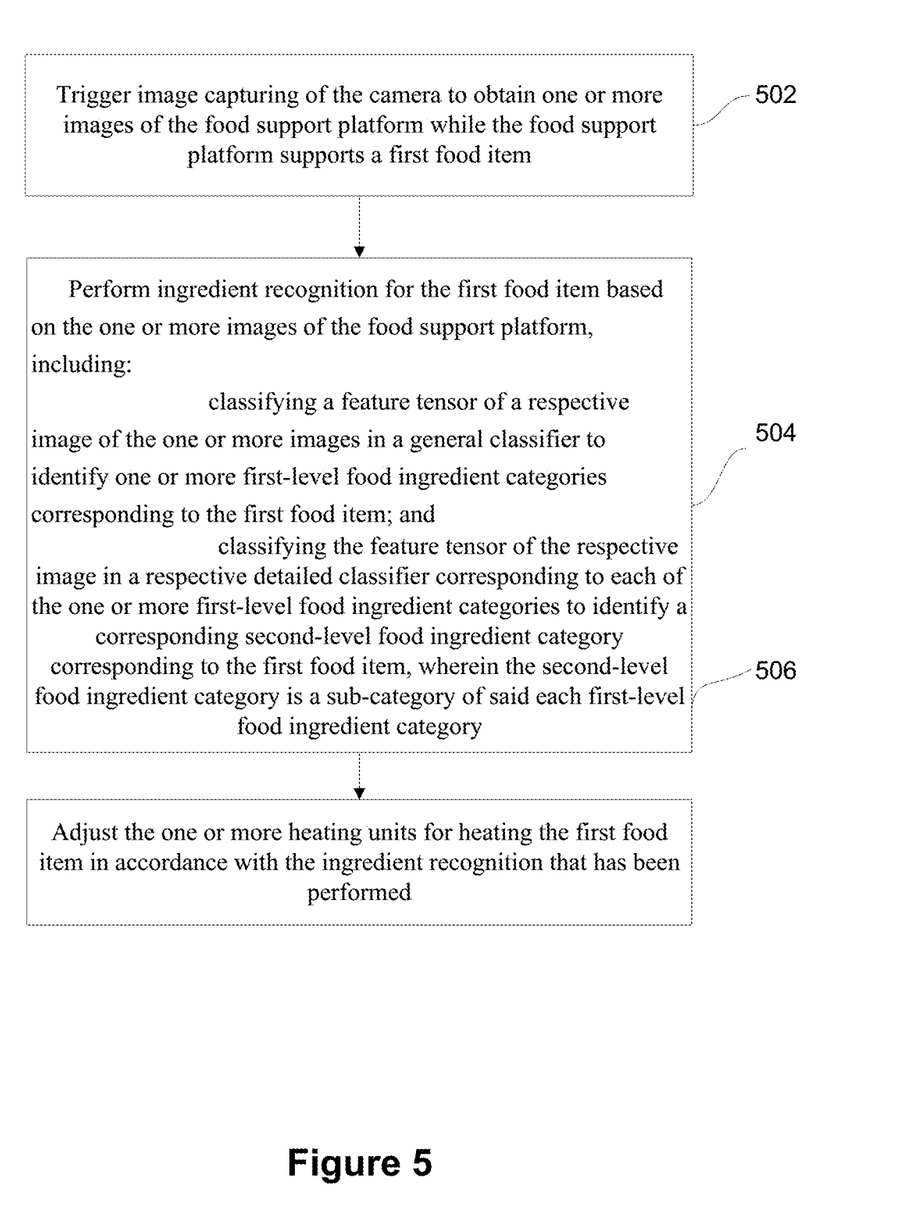
FIG. 5 is a flowchart of a food preparation method utilizing ingredient recognition in accordance with some embodiments.

FIG. 5 is a flowchart of a food preparation method 500 utilizing ingredient recognition in accordance with some embodiments. The method is performed at a food preparation system (e.g., 102) comprising: a food support platform (e.g., oven rack, microwave rotation plate, rotational skewer of a rotisserie, surface of a cooktop, etc.) configured to support food (e.g., pizza, stir fry dish, etc.); a camera (e.g., camera 210, 212, etc.) with a field of view directed to the food support platform; one or more heating units (e.g., food preparation mechanics 120) that are configured to heat food placed on the food support platform; and a food preparation control unit (e.g., control adjustment recommendation system 112 and food preparation controls 118) for controlling the camera and the one or more heating units, the food preparation control unit including one or more processors and memory. The method includes: triggering (502) image capturing of the camera to obtain one or more images of the food support platform while the food support platform supports a first food item; performing (504) ingredient recognition for the first food item based on the one or more images of the food support platform, including: classifying a feature tensor of a respective image of the one or more images in a general classifier to identify one or more first-level food ingredient categories corresponding to the first food item; and classifying the feature tensor of the respective image in a respective detailed classifier corresponding to each of the one or more first-level food ingredient categories to identify a corresponding second-level food ingredient category corresponding to the first food item, wherein the second-level food ingredient category is a sub-category of said each first-level food ingredient category; and, adjusting (506) the one or more heating units for heating the first food item in accordance with the ingredient recognition that has been performed.

In some embodiments, the food preparation system monitors content in the field of view of the camera, and detects a change in the field of view of the camera during the monitoring, wherein triggering image capturing of the camera to obtain the one or more images of the food support platform includes capturing a series of images over a period of time in response to detecting the change in the field of view of the camera.

In some embodiments, prior to performing ingredient recognition for the first food item based on the one or more images of the food support platform, the food preparation system filters each respective image of the one or more images of the food support platform using a baseline image captured before the first food item is placed on the food support platform.

In some embodiments, the food preparation system classifies the feature tensor of the respective image of the one or more images in the general classifier to identify one or more first-level food ingredient categories corresponding to the first food item by: sorting the one or more first-level food ingredient categories based on a respective food quantity corresponds to each of the one or more first-level food ingredient categories that have been identified for the first food item; and selecting a predefined number of first-level food ingredient categories from the one or more first-level food ingredient categories for performing the classification using the respective detailed classifier corresponding to each of the predefined number of first-level food ingredient categories.

In some embodiments, the food preparation system identifies a first food recipe that includes the respective second-level food ingredient categories that are identified for the predefined number of first-level food ingredient categories; and the food preparation system determines additional ingredients of the first food item based on the first food recipe, wherein the additional ingredients are not among the respective second-level food ingredient categories that are identified for the predefined number of first-level food ingredient categories.

In some embodiments, the food preparation system determines nutritional information for the first food item based on the respective second-level food ingredient categories that are identified for the predefined number of first-level food ingredient categories and the additional ingredients identified based on the first food recipe.

In some embodiments, the food preparation system identifies a second food recipe that includes the respective second-level food ingredient categories that are identified for the predefined number of first-level food ingredient categories; the food preparation system compares nutritional information for the first food recipe and the second food recipe; and the food preparation system provides a recommendation for adjusting cooking method based on the comparison of the nutritional information for the first food recipe and the second food recipe.

Other details of the method and the food preparation system are described in other parts of the disclosure and is not repeated here in the interest of brevity. It should be understood that the particular order in which the operations in FIG. 5 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to method 500 described above.

Figure 6:
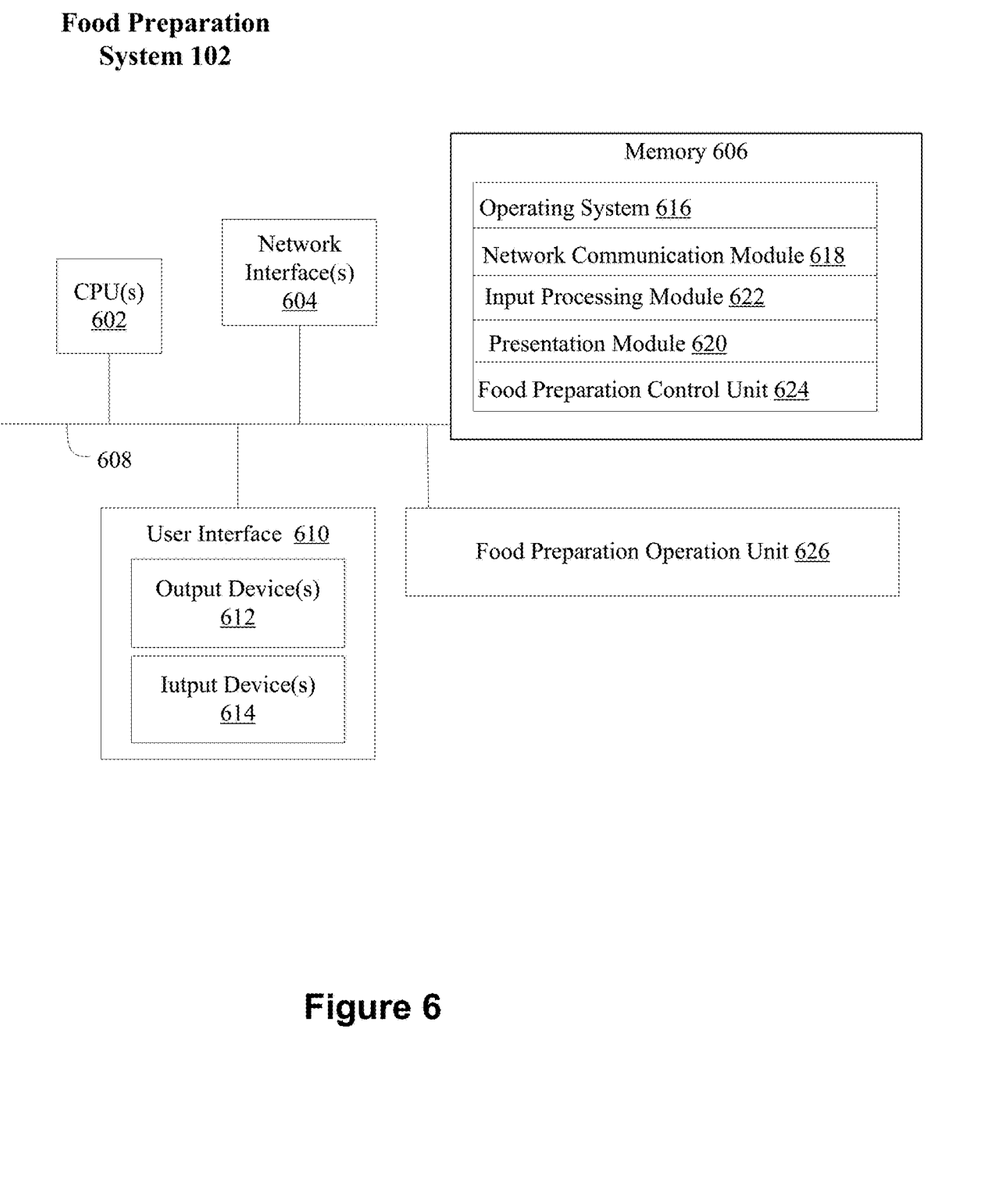
FIG. 6 is a block diagram of a food preparation system in accordance with some embodiments.

FIG. 6 is a block diagram of a food preparation system 102 in accordance with some embodiments. The food preparation system 102 includes one or more processing units (CPUs) 602, one or more network interfaces 604, memory 606, and one or more communication buses 608 for interconnecting these components (sometimes called a chipset). Food preparation system 102 also includes a user interface 610. User interface 610 includes one or more output devices 612 that enable presentation of media content, including one or more speakers and/or one or more visual displays. User interface 610 also includes one or more input devices 614, including user interface components that facilitate user input such as a keyboard, a mouse, a voice-command input unit or microphone, a touch screen display, a touch-sensitive input pad, a gesture capturing camera, or other input buttons or controls. In some embodiments, food preparation system 102 further includes sensors, which senses operating environment information of the food preparation system 102. Sensors include but are not limited to one or more heat sensors, light sensors, one or more cameras, humidity sensors, one or more motion sensors, one or more biological sensors (e.g., a galvanic skin resistance sensor, a pulse oximeter, and the like), weight sensors, spectrometers, and other sensors. Furthermore, the food preparation system 102 includes food preparation operation unit 626 (e.g., heating means that are based on electricity, induction, gas, radiation, etc.). Memory 606 includes non-volatile memory, such as one or more magnetic disk storage devices, one or more optical disk storage devices, one or more flash memory devices, or one or more other non-volatile solid state storage devices. Memory 606, optionally, includes one or more storage devices remotely located from one or more processing units 602. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

operating system 616 including procedures for handling various basic system services and for performing hardware dependent tasks;

network communication module 618 for connecting to external services via one or more network interfaces 604 (wired or wireless);

presentation module 620 for enabling presentation of information;

input processing module 622 for detecting one or more user inputs or interactions from one of the one or more input devices 614 and interpreting the detected input or interaction;

food preparation control unit 624, which controls the food preparation system 102, including but not limited to: imaging control unit for controlling the one or more cameras and other sensors; image processing system, ingredient recognition system, ingredient data integration system, control adjustment and recommendation system; and other modules for performing other functions set forth herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A food preparation system, comprising:
   a food support platform configured to support food;
   a camera with a field of view directed to the food support platform;
   one or more heating units that are configured to heat food placed on the food support platform; and
   a food preparation control unit for controlling the camera and the one or more heating units, the food preparation control unit including one or more processors and memory storing instructions, the instructions, when executed by the one or more processors cause the processors to perform operations comprising:
      triggering image capturing of the camera to obtain one or more images of the food support platform while the food support platform supports a first food item;
      performing ingredient recognition for the first food item based on the one or more images of the food support platform, including:
         classifying a feature tensor of a respective image of the one or more images in a general classifier to identify one or more first-level food ingredient categories corresponding to the first food item; and
         classifying the feature tensor of the respective image in a respective detailed classifier corresponding to each of the one or more first-level food ingredient categories to identify a corresponding second-level food ingredient category corresponding to the first food item, wherein the second-level food ingredient category is a sub-category of said each first-level food ingredient category; and,
      adjusting the one or more heating units for heating the first food item in accordance with the ingredient recognition that has been performed.

2. The food preparation system of claim 1, wherein the operations include:
   monitoring content in the field of view of the camera; and
   detecting a change in the field of view of the camera during the monitoring, wherein triggering image capturing of the camera to obtain the one or more images of the food support platform includes capturing a series of images over a period of time in response to detecting the change in the field of view of the camera.

3. The food preparation system of claim 2, wherein the operations include:
   prior to performing ingredient recognition for the first food item based on the one or more images of the food support platform, filtering each respective image of the one or more images of the food support platform using a baseline image captured before the first food item is placed on the food support platform.

4. The food preparation system of claim 1, wherein classifying the feature tensor of the respective image of the one or more images in the general classifier to identify one or more first-level food ingredient categories corresponding to the first food item further includes:
   sorting the one or more first-level food ingredient categories based on a respective food quantity corresponds to each of the one or more first-level food ingredient categories that have been identified for the first food item; and
   selecting a predefined number of first-level food ingredient categories from the one or more first-level food ingredient categories for performing the classification using the respective detailed classifier corresponding to each of the predefined number of first-level food ingredient categories.

5. The food preparation system of claim 4, wherein the operations further include:
   identifying a first food recipe that includes the respective second-level food ingredient categories that are identified for the predefined number of first-level food ingredient categories; and
   determining additional ingredients of the first food item based on the first food recipe, wherein the additional ingredients are not among the respective second-level food ingredient categories that are identified for the predefined number of first-level food ingredient categories.

6. The food preparation system of claim 5, wherein the operations further include:

determining nutritional information for the first food item based on the respective second-level food ingredient categories that are identified for the predefined number of first-level food ingredient categories and the additional ingredients identified based on the first food recipe.

7. The food preparation system of claim 5, wherein the operations further include:
identify a second food recipe that includes the respective second-level food ingredient categories that are identified for the predefined number of first-level food ingredient categories;
comparing nutritional information for the first food recipe and the second food recipe; and
providing a recommendation for adjusting cooking method based on the comparison of the nutritional information for the first food recipe and the second food recipe.

* * * * *